Patented Dec. 30, 1924.

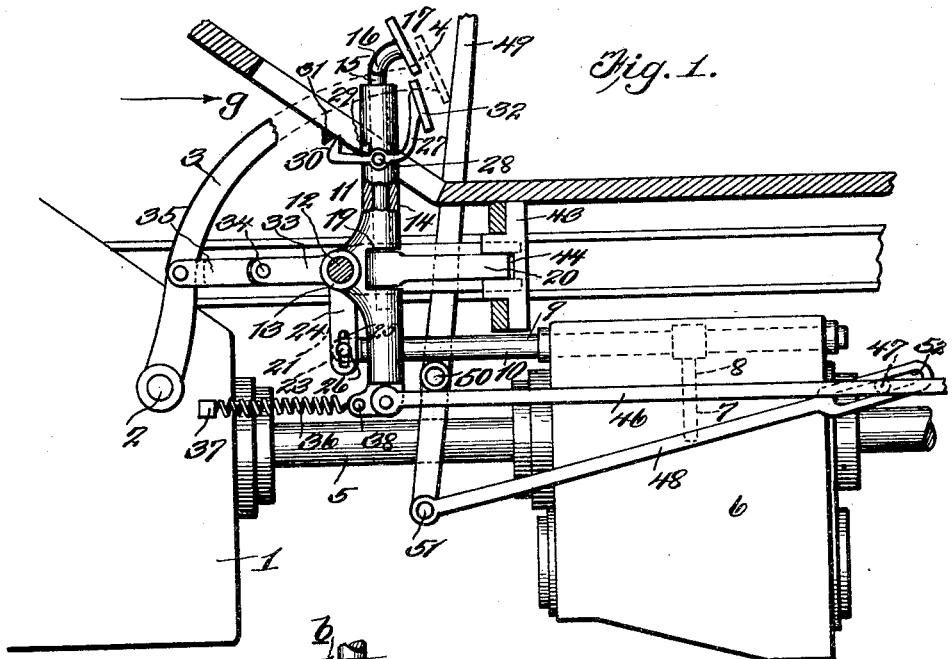

1,521,535

UNITED STATES PATENT OFFICE.

ERNEST C. HICKS, OF WAYNESVILLE, MISSOURI.

GEAR-SHIFT MECHANISM.

Application filed December 6, 1923. Serial No. 678,993.

*To all whom it may concern:*

Be it known that I, ERNEST C. HICKS, a citizen of the United States, residing at Waynesville, in the county of Pulaski and State of Missouri, have invented new and useful Improvements in Gear-Shift Mechanisms, of which the following is a specification.

It is the purpose of the present invention to provide, in a gear shift mechanism, a construction consisting of readily actuable gear shifting means wherein it is desirable to place the gear shifting elements under the control of foot levers or pedals, and in this connection to provide a mechanism involving improvements on and refinement of the construction disclosed in the Patent No. 1,392,159, granted September 27, 1921, to Ernest C. Hicks.

Another purpose is to provide a gear shift mechanism including means for shifting the gears of the transmission and including operative connections with the clutch pedal whereby, upon operating said mechanism, the clutch pedal may throw the clutch in gear.

Still another purpose is to provide a gear shift mechanism, the construction and arrangement of which are such as to shift the gears of the transmission prior to completely throwing the clutch in gear.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view of a portion of an automobile, showing the foot-board and the floor in section and the clutch casing and transmission case in elevation, with the improved gear shift mechanism applied in accordance with the invention.

Figure 2 is a plan view showing a part of an actuating sleeve in section.

Figure 3 is a detail view of the selector and the clutch arms.

Figure 4 is a detail perspective view of one of the clutch arms.

Figure 5 is a detail perspective view of the rocker shaft and rocker sleeve.

Referring to the drawings, 1 designates the clutch casing which may constitute a part of the motor block (not shown) and 2 designates a clutch operating shaft which connects with the clutch (not shown) in any well known manner (not shown). The shaft 2 includes a clutch pedal 3 which has the usual foot plate 4.

An engine shaft 5 is employed including a transmission, the detailed construction of which is omitted, the casing 6 thereof being shown in general outline. However, to carry out the function of the invention, the transmission includes shiftable yokes 7 and 8, the yoke 7 serving to shift certain of the gears (not shown) of the transmission to first speed or reverse, the yoke 8 serving to shift the gears to second or high speed. The yokes 7 and 8 are carried by the shifting rods 9 and 10 which are guided through the transmission case 6.

A rocker 11 is provided which comprises a rocking shaft 12 and a rocking sleeve 13, one being rockable independently of the other. The sleeve carries the rocker arm 14 which is tubular, and mounted therein for rocking movement on an axis at right angles to the axis of the shaft 12 is a rocking spindle 15, the upper end of which carries a cross arm 16. Both ends of the cross arm have foot plates 17 and 18 for the purpose of rocking the spindle in either direction as well as imparting movement to the rocker which also includes the arm 14. Adjacent where the arm is carried by the sleeve 13, an opening 19 is provided for the reception of a selector 20 which is fixed in any suitable manner to the lower end of the spindle 15.

Fixed to the shaft 12 and depending therefrom is an arm 21, its slotted end 22 being connected to the shifting rod 9, as at 23, and fixed to the sleeve 13 and depending therefrom is an arm 24 having its slotted end 25 connected to the shifting rod 10, as at 26. When the rocker shaft 12 is moved in the direction of the arrow *a*, the shifting rod 9 moves the yoke 7 to shift the transmission gears to first speed and when the rocker shaft is moved in the direction of the arrow *b*, the rod 9 shifts the yoke 7 to reverse. When the sleeve 13 is moved in the direction of the arrow *c*, the gear shifting rod 10 moves the yoke 8 to shift the transmission gears to second speed and when the sleeves 13 is rocked in the direction of the arrow *d*, the shifting rod 10 moves the yoke 8 to shift the transmission gears to high speed.

The arm 14 has a foot pedal 27 pivotally mounted at 28 thereon, there being an abutment 29 to hold the foot pedal in its normal position shown in Figure 1, and carried by one arm of the foot pedal is a hook 30 for engagement with a keeper 31 on the under face of the foot-board of the automobile or other motor driven vehicle to hold the arm and the rocker in forward position with the yoke 7 in reverse position or the yoke 8 in second position. It will be noted that the foot pedal is positioned so that its foot plate 32 is in close position to the foot plates 17 and 18, so that the heel of the foot of the operator may engage the foot plate 32 while the toe of the operator's foot may engage either of the foot plates 17 or 18. In fact, the operator first places the heel of the foot on the foot pedal plate 32 which releases the arm, then the ball of the foot is placed on either one of the foot plates 17 or 18 for the purpose of actuating the rocker shaft.

The arm 14 is loose upon the rocker shaft 12 and where it is fulcrumed thereon it has a lug 33 to which a link 35 is connected, as at 34. The link 35 is, in turn, pivoted to the clutch pedal 3. Obviously, when the arm 14 is tilted in either direction, it will actuate the clutch pedal in the direction of the arrow *g*, as shown in Figure 1. No matter in which direction the arm 14 may tilt, the clutch pedal always moves in the direction indicated at *g*, hence moving the clutch in gear, whereby motion may be imparted to the engine shaft 5.

A tension spring 36 is provided and has one end connected at 37 to the clutch case and its other end connected at 38 to a lug on the lower end of the arm 14 for the purpose of operating the arm in one direction when shifting the transmission gears in first and high speeds. Fixed to the rocker shaft 12 and extending rearwardly thereof is a clutch arm 39 which is forked, as shown at 40. Fixed to and extending rearwardly of the sleeve 13 is a clutch arm 41. The clutch arms 39 and 41 are in parallelism, the latter being also forked, as shown at 42.

A selector retaining member 43 is carried in any suitable manner by the chassis of the automobile or other motor driven vehicle, there being a keeper recess 44 for the reception of the selector 20 for holding the entire rocker in neutral position, thereby preventing the arm 14 from tilting in either direction. Suitable springs 45 are mounted between the forks of the clutch arms 39 and 41. These springs extend into the keeper recess 44 and act to retain one or the other of the clutch arms in position while the other actuates. The springs also assist in retaining the selector in engagement between the forks of the clutch arms when the selector is moved into engagement with either of them.

Referring to Figure 1, it will be noted that the rocker with the arm 14 and the yokes 7 and 8 are shown as in neutral positions and may be held in such positions either by the foot applied upon the foot plate 4 of the pedal 3 or by the brake lever 49 and the link 48. When the operator presses upon the foot pedal plate 18 of the rocking spindle, the selector is moved in engagement with the clutch arm 39. The pressure to accomplish this result is not sufficient to cause the arm 14 to tilt forward, hence the tension of the spring 36 is sufficient to tilt the arm 14 rearwardly and as this tilting action is accomplished the foot pressure upon the entire arm is gradually relieved so that the arm 21 will move the shifting rod 9 forwardly, moving the yoke 7 to shift the transmission gears to first speed. To move the yoke 7 back to neutral, it is necessary to apply foot pressure upon the entire rocker or preferably foot pressure upon the clutch pedal 3. The foot pressure upon the pedal 3 will maintain the arm 14 and the yokes 7 and 8 in neutral positions.

To move the yoke 7 to reverse position, the operators applies foot presure upon the pedal plate 18, again moving the selector 20 in engagement with the clutch arm 39. Upon applying sufficient pressure to rock the arm 14 against the action of the spring 36, the shifting rod 9 moves rearwardly and hence moves the yoke 7 to shift the transmission gears to reverse. In this instance, the action of the spring will return the arm 14 to its initial position and restore the yoke 7 to neutral. Pressure upon the pedal 3 will also return the yoke from its reverse position to neutral.

Foot pressure upon the foot pedal plate 17 will move the selector 20 in engagement with the clutch arm 41 and by continued pressure upon the foot pedal plate 17, the rocker arm 14 will tilt against the action of the spring 36, moving the rod 10 rearwardly and the yoke 8 into second position, thereby shifting the gears of the transmission to second speed. The return of the arm 14 to initial position is also accomplished by the spring 36 or by foot pressure upon the pedal 3, the yoke 8 being returned to neutral.

Upon causing foot pressure upon the foot pedal plate 17, the selector again engaging the clutch arm 41 and after rocking the spindle sufficiently to allow the pressure to be gradually relieved, the action of the spring 36 will rock the sleeve in the direction of the arrow *d* in Figure 2, moving the yoke 8 forward to third position and shifting the transmission gears to high speed. In this instance, it is necessary to return the rocker arm to initial position and the yoke 8 to neutral position by applying foot pressure either upon the foot pedal plate 17 or preferably upon the pedal 3.

In each instance, when shifting the gears of the transmission, the clutch pedal 3 is actuated to throw the clutch in gear. When the clutch arm 39 is tilted, its spring 45 assists in holding the selector 20 in engagement with the forks while the other spring 45 engaging within the keeper recess 44 prevents tilting movement of the clutch arm 46. When the clutch arm 41 is tilted, its spring 45 acts to retain the selector in engagement with the forks thereof, while the opposite spring 45 engages with the keeper recess 44 and retains the clutch arm 39 against movement.

An emergency brake lever 49 is provided and may be pivoted at 50 to any suitable location on the frame of the automobile, and pivoted to its lower end 51 is a link 48. A brake rod 46 is provided for connection in any suitable manner (not shown) with the usual brake mechanism (not shown), and has its forward end pivoted to the lower end of the arm 14. When the arm 14 and the arms 21 and 24 operate, the movement of the arm 14 is never sufficient to apply the brakes. However, in case of emergency the lever 49 may be actuated, thereby causing either end of the slot 52 in the link 48 to engage with the lateral pin 47 of the rod 46 and immediately apply the brakes and restore the arm 14 to its initial position and the transmission gears back to neutral.

In other words, the lever 49 constitutes a brake operating element acting through the link 46, so that the operation of the brakes and the restoration of the transmission gears to neutral may be accomplished, due to the slot 52 cooperating with the pin 47.

The invention having been set forth, what is claimed is:

1. A gear shifting mechanism having a pedal actuated rocker consisting of members independently movable in opposite directions from a neutral position, and a foot actuable selector carried by the pedal for communicating motion selectively to said members, said selector having a spindle provided with a cross head having pedal heads for alternate foot pressure.

2. A gear shifting mechanism having a pedal actuated rocker consisting of members independently movable in opposite directions from a neutral position, and a foot actuable selector carried by the pedal for communicating motion selectively to said members, said selector consisting of a spindle carried tongue mounted for rocking movement, and clutch arms carried by said members for selective engagement thereby.

3. A gear shifting mechanism having a pedal actuated rocker consisting of members independently movable in opposite directions from a neutral position, and a foot actuable selector carried by the pedal for communicating motion selectively to said members, the rocker being operatively connected with the clutch and having reversible means for operating the selector.

4. A gear shifting mechanism for transmissions including a rocker operable for shifting the transmission gears either to first, second, third or reverse positions, a clutch normally open and including a clutch pedal, and means connected to and operable by the rocker and operatively connected with the clutch pedal for throwing the clutch in gear substantially subsequent to the shifting of the transmission gears.

5. In a transmission gear shifting mechanism, the combination with a clutch mechanism including a clutch pedal, of a transmission mechanism, means operable to shift the gears of the transmission to first, second, third or reverse positions, and means connecting said first means and the clutch pedal for moving the clutch in gear substantially subsequent to the shifting of the transmission gears.

6. In a transmission gear shifting mechanism, the combination with a transmission mechanism including separable yokes for shifting the transmission gears from first to reverse and vice versa and from second to third and vice versa, coaxial rocking members operatively connecting with said yokes, clutch arms carried by said members, and a rocker arm on one of said members and including means rocking on an axis at right angles to said members and provided with a selector to engage either one of said clutch arms for rocking one or the other of said members.

7. In a transmission gear shifting mechanism, the combination with a transmission mechanism including separable yokes for shifting the transmission gears from first to reverse and vice versa and from second to third and vice versa, coaxial rocking members operatively connecting with said yokes, clutch arms carried by said members, a rocker arm on one of said members and including means rocking on an axis at right angles to said members and provided with a selector to engage either one of said clutch arms for rocking one or the other of said members, and tension means connecting with the rocker arm for moving the same in one direction.

8. In a transmission gear shifting mechanism, the combination with a transmission mechanism including separable yokes for shifting the transmission gears from first to reverse and vice versa and from second to third and vice versa, coaxial rocking members operatively connecting with said yokes, clutch arms carried by said members, a rocker arm on one of said members and including means rocking on an axis at right angles to said members and provided with a selector to engage either one of said clutch arms for rocking one or the other of said members, tension means connecting with the rocker arm for moving the same in one direction, a clutch mechanism normally open and including a clutch pedal, and means operatively connecting the rocker arm and the clutch pedal for moving the clutch in gear substantially subsequent to completing the shifting movement of one or the other of said yokes.

In testimony whereof he affixes his signature.

ERNEST C. HICKS.